United States Patent
Corda et al.

(10) Patent No.: US 9,128,829 B2
(45) Date of Patent: Sep. 8, 2015

(54) MOBILE COMMUNICATION DEVICE AND METHOD FOR SWAPPING MIFARE APPLICATIONS

(75) Inventors: Alexandre Corda, Nice (FR); Dominique Brule, Antibes (FR); Mathew Smith, Antibes (FR); Ismaila Wane, Tucson, AZ (US); Vincent Lemonnier, Nice (FR)

(73) Assignee: Quotainne Enterprises LLC, Wilmington, DE (US)

( * ) Notice: Subject to any disclaimer, the term of this patent is extended or adjusted under 35 U.S.C. 154(b) by 838 days.

(21) Appl. No.: 12/675,995

(22) PCT Filed: Aug. 25, 2008

(86) PCT No.: PCT/IB2008/053402
§ 371 (c)(1),
(2), (4) Date: Sep. 7, 2010

(87) PCT Pub. No.: WO2009/031065
PCT Pub. Date: Mar. 12, 2009

(65) Prior Publication Data
US 2010/0323678 A1    Dec. 23, 2010

(30) Foreign Application Priority Data

Sep. 3, 2007   (EP) .................................. 07291058

(51) Int. Cl.
*G06F 12/00* (2006.01)
*G06F 12/02* (2006.01)
*G06F 12/06* (2006.01)

(52) U.S. Cl.
CPC .................................. *G06F 12/0638* (2013.01)

(58) Field of Classification Search
CPC ......... G06F 12/00; G06F 12/02; G06F 15/16; H04M 2250/14; H04B 1/3816
USPC .......................................................... 455/558
See application file for complete search history.

(56) References Cited

U.S. PATENT DOCUMENTS

| | | | |
|---|---|---|---|
| 6,278,885 B1 * | 8/2001 | Hubbe et al. .................. | 455/558 |
| 6,760,796 B1 * | 7/2004 | Rossmann et al. ............. | 710/72 |
| 6,824,064 B2 * | 11/2004 | Guthery et al. ............... | 235/492 |
| 7,413,113 B1 * | 8/2008 | Zhu ............................. | 235/375 |
| 8,184,810 B2 * | 5/2012 | Furuyama ..................... | 380/239 |
| 2004/0039876 A1 * | 2/2004 | Nelson et al. ................. | 711/115 |
| 2005/0108571 A1 | 5/2005 | Lu et al. | |
| 2005/0139680 A1 * | 6/2005 | Anttila et al. ............. | 235/462.46 |
| 2005/0235123 A1 | 10/2005 | Zimmer et al. | |

(Continued)

FOREIGN PATENT DOCUMENTS

WO    2007/068991 A1    6/2007

OTHER PUBLICATIONS

Philips Semiconductors; "Mifare Standard Card IC MF1 IC S50 Functional Specification Revision 4.0"; Jul. 1998; 18 pages.

(Continued)

*Primary Examiner* — Marisol Figueroa
(74) *Attorney, Agent, or Firm* — Michael H. Lyons

(57) ABSTRACT

A mobile communication device (1) comprises a MIFARE memory (MM) being configured as a MIFARE Classic card or an emulated MIFARE Classic memory, a swap memory (SM) and a MIFARE applications manager (MAM) being adapted to swap MIFARE 5 applications between the MIFARE memory (MM) and the swap memory (SM).

26 Claims, 10 Drawing Sheets

(56) References Cited

U.S. PATENT DOCUMENTS

| | | |
|---|---|---|
| 2006/0214005 A1* | 9/2006 | Agami et al. ................. 235/492 |
| 2006/0251096 A1 | 11/2006 | Metsker |
| 2007/0068384 A1 | 3/2007 | Taylor |
| 2007/0087785 A1* | 4/2007 | Kikuchi et al. ............... 455/558 |
| 2007/0260657 A1* | 11/2007 | Nagayama et al. ........... 708/200 |
| 2007/0293155 A1 | 12/2007 | Liao et al. |
| 2008/0060085 A1* | 3/2008 | Samzelius et al. ............. 726/30 |
| 2009/0098825 A1* | 4/2009 | Huomo et al. ............... 455/41.1 |
| 2012/0196529 A1* | 8/2012 | Huomo et al. ............... 455/41.1 |

OTHER PUBLICATIONS

Klaus Finkenzeller; "RFID Handbuch"; Hanser, 3rd edition; 2002.

* cited by examiner

| Sector | Block | Byte Number within a Block | | | | | | | | | | | | | | | | Description |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | |
| 15 | 3 | Key A | | | | | | Access Bits | | | | | | Key B | | | | Sector Trailer 15 |
| | 2 | | | | | | | | | | | | | | | | | Data |
| | 1 | | | | | | | | | | | | | | | | | Data |
| | 0 | | | | | | | | | | | | | | | | | Data |
| 14 | 3 | Key A | | | | | | Access Bits | | | | | | Key B | | | | Sector Trailer 14 |
| | 2 | | | | | | | | | | | | | | | | | Data |
| | 1 | | | | | | | | | | | | | | | | | Data |
| | 0 | | | | | | | | | | | | | | | | | Data |
| ⋮ | ⋮ | | | | | | | | | | | | | | | | | |
| 1 | 3 | Key A | | | | | | Access Bits | | | | | | Key B | | | | Sector Trailer 1 |
| | 2 | | | | | | | | | | | | | | | | | Data |
| | 1 | | | | | | | | | | | | | | | | | Data |
| | 0 | | | | | | | | | | | | | | | | | Data |
| 0 | 3 | Key A | | | | | | Access Bits | | | | | | Key B | | | | Sector Trailer 0 |
| | 2 | | | | | | | | | | | | | | | | | Data |
| | 1 | | | | | | | | | | | | | | | | | Data |
| | 0 | | | | | | | | | | | | | | | | | Manufacturer Block |

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Key A | | | | | | Access Bits | | | | Key B (optional) | | | | | |

MOBILE COMMUNICATION DEVICE AND METHOD FOR SWAPPING MIFARE APPLICATIONS

FIELD OF THE INVENTION

The invention relates to a mobile communication device comprising a MIFARE Classic card or an emulated MIFARE Classic memory and a swap memory.

The invention further relates to a method for managing MIFARE applications in a mobile communication device that comprises a MIFARE Classic card or an emulated MIFARE Classic memory and a swap memory.

The invention further relates to a computer program product directly loadable into the memory of a mobile communication device being equipped with a MIFARE device.

The invention further relates to a mobile communication device that comprises a classic or emulated MIFARE memory and a swap memory, wherein the mobile communication device is adapted to process the computer program product mentioned in the above paragraph.

BACKGROUND OF THE INVENTION

The MIFARE® classic family, developed by NXP Semiconductors is the pioneer and front runner in contactless smart card ICs operating in the 13.56 MHz frequency range with read/write capability. MIFARE® is a trademark of NXP Semiconductors. MIFARE complies with ISO14443 A, which is used in more than 80% of all contactless smart cards today. The technology is embodied in both cards and card reader devices. MIFARE cards are being used in an increasingly broad range of applications (including transport ticketing, access control, e-payment, road tolling, and loyalty applications). MIFARE Standard (or Classic) cards employ a proprietary high-level protocol with a proprietary security protocol for authentication and ciphering. MIFARE® technology has become a standard for memory devices with key-protected memory sectors. One example for a published product specification of MIFARE® technology is the data sheet "MIFARE® Standard Card IC MF1 IC S50-Functional Specification" (1998) which is herein incorporated by reference. MIFARE® technology is also discussed in: Klaus Finkenzeller, "RFID Handbuch", HANSER, $3^{rd}$ edition (2002).

The MIFARE Classic cards are fundamentally just memory storage devices, where the memory is divided into sectors and blocks with simple security mechanisms for access control. Each device has a unique serial number. Anticollision is provided so that several cards in the field may be selected and operated in sequence.

The MIFARE Standard 1k offers about 768 bytes of data storage, split into 16 sectors with 4 blocks of 16 bytes each (one block consists of 16 byte); each sector is protected by two different keys, called A and B. They can be programmed for operations like reading, writing, increasing value blocks, etc. The last block of each sector is called "trailer", which contains two secret keys (A and B) and programmable access conditions for each block in this sector. In order to support multi-application with key hierarchy an individual set of two keys (A and B) per sector (per application) is provided.

The memory organization of a MIFARE Standard 1k card is shown in FIG. 1. The 1024×8 bit EEPROM memory is organized in 16 sectors with 4 blocks of 16 bytes each. The first data block (block 0) of the first sector (sector 0) is the manufacturer block which is shown in detail in FIG. 2. It contains the serial number of the MIFARE card that has a length of four bytes (bytes 0 to 3), a check byte (byte 4) and eleven bytes of IC manufacturer data (bytes 5 to 15). The serial number is sometimes called MIFARE User IDentification (MUID) and is a unique number. Due to security and system requirements the manufacturer block is write protected after having been programmed by the IC manufacturer at production. However, the MIFARE specification allows to change the serial number during operation of the MIFARE card, which is particularly useful for MIFARE emulation cards like SmartMX cards.

SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

The ability to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

It should be noted that the emulation of MIFARE Classic cards is not only restricted to SmartMX cards, but there may also exist other present or future smartcards being able to emulate MIFARE Classic cards.

Recently, mobile communication devices have been developed which contain MIFARE devices, either being configured as MIFARE Classic cards or as MIFARE emulation devices like SmartMX cards. These mobile communication devices comprise e.g. mobile phones with Near Field Communication (NFC) capabilities, but are not limited to mobile phones.

While both MIFARE Classic cards and MIFARE emulation devices have turned out as a story of success in the market, recent tendencies to install multiple applications on a single MIFARE Classic or emulation device have resulted in problems that may hinder the further success of these devices and of mobile communication devices in which MIFARE devices are arranged.

The first problem is that due to the limitation of the MIFARE memory (i.e. 1 KByte or 4 KByte), the number of applications the end user can install is very limited. This bottleneck could end in reluctance of end users to multi-application MIFARE devices, because the end user will react annoyed if he/she wants to install a new application, but the MIFARE memory is already full.

Secondly, Service Providers with existing infrastructure will enforce the destination sectors in the MIFARE memory, where their applications (tickets, coupons, access controls . . . ) have to install. This behavior can result in memory allocation collisions, if several Service Providers want to have their applications residing in same sectors of the MIFARE memory.

OBJECT AND SUMMARY OF THE INVENTION

It is an object of the invention to provide a mobile communication device of the type defined in the opening paragraph and a method of the type defined in the second paragraph, in which the problems mentioned above are overcome.

In order to achieve the object defined above, with a mobile communication device according to the invention characteristic features are provided so that such a mobile communication device can be characterized in the way defined below, that is:

A mobile communication device comprising a MIFARE memory being configured as a MIFARE Classic card or an emulated MIFARE Classic memory, a swap memory and a MIFARE applications manager being adapted to swap MIFARE applications between the MIFARE memory and the swap memory.

In order to achieve the object defined above, with a method according to the invention characteristic features are provided so that a method according to the invention can be characterized in the way defined below, that is:

A method for managing MIFARE applications in a mobile communication device that comprises a MIFARE memory being configured as a MIFARE Classic card or an emulated MIFARE Classic memory and a swap memory, the method comprising swapping MIFARE applications between the MIFARE memory and the swap memory.

In order to achieve the object defined above, a computer program product being directly loadable into the memory of a mobile communication device with a MIFARE memory being configured as a MIFARE Classic card or an emulated MIFARE Classic memory and a swap memory comprises software code portions for performing—when running on the mobile communication device—the steps of the method for operating a mobile communication device according to the above paragraph.

In order to achieve the object defined above, a mobile communication device according to the invention comprises an arithmetic-logic unit and a memory and processes the computer program product according to the above paragraph.

The present invention allows to overcome the above problems in the environment of mobile communication devices, particularly in a NFC phone environment, by providing MIFARE applications swapping from the MIFARE memory to a swap memory within the mobile communication device in which the MIFARE device is located, and vice versa.

In one embodiment of the invention the swap-memory is part of a file-system of the mobile communication device, thereby allowing to make use of memory that is always provided in mobile communication devices.

In another embodiment of the invention the swap-memory is located in a non-volatile memory device being arranged in the mobile communication device. The swap memory may be configured as a memory (e.g. EEPROM) of a secure element of a Near Field Communication (NFC) device (for example a SmartMX card) that is arranged in the mobile communication device. Storage of applications in the EEPROM of the secure element of a Near Field Communication device guarantees that the MIFARE applications are always stored in a secure way.

It is preferred that the swap-memory is bigger than the MIFARE memory. This allows to install more MIFARE applications than could be installed directly in the MIFARE memory and allows also to keep backup-copies of all MIFARE applications that are installed in the MIFARE memory.

In one embodiment of the invention swapping of MIFARE applications between the MIFARE memory and the swap memory is triggered by trigger signals, thereby allowing to influence the MIFARE application swapping process.

In one embodiment of the invention the trigger signal is an external trigger signal, like an SMS, or a swapping instruction received from a RFID reader/writer, thereby enabling a Service Provider etc. to externally influence the swapping process and the arrangement of MIFARE applications in the MIFARE memory and the swap memory, respectively.

In another embodiment of the invention the trigger signal is a voice instruction or a sound signal, e.g. an infra- or ultrasonic signal. This allows to influence the swapping process by either the user of the mobile communication device or by sound sources, e.g. being arranged at the entrances of ticket counters and instructing the mobile communication device by sound signals to swap a MIFARE ticket into the MIFARE memory so that it can be read by a NFC ticketing machine. Similarly, swapping of position-dependent MIFARE applications into the MIFARE memory (or—the other way round—swapping of other MIFARE applications that are not related to a specific position) can be achieved, when the trigger signal is a position signal, like a GPS signal.

Further, it is of advantage if swapping of MIFARE application can be influenced by internal alarm signals of the mobile communication device, like timer or calendar applications. This achieved when the detectable trigger signal is an internal alarm signal, e.g. generated by a timer or calendar application of the mobile communication device.

In yet another embodiment of the invention swapping can be directly influenced by the user of the mobile communication device. This achieved, when the detectable trigger signals comprise signals generated by a user interface of the mobile communication device.

However, in order to achieve proper management of MIFARE applications in the mobile communication device the present invention provides also for automatic swapping of MIFARE applications in dependence of at least one automated swapping rule, e.g. according to a begin or end date and/or time of a MIFARE application, or the available space in the MIFARE memory.

The present invention is perfectly suited for mobile phones with NFC capabilities that can be equipped with (emulated) MIFARE devices, like SmartMX cards.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to them.

DESCRIPTION OF EMBODIMENTS

Figures 1, 2, 3:
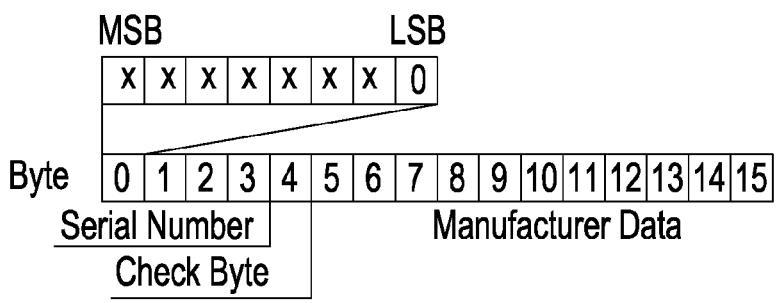
FIG. 1 shows the memory organization of a MIFARE Standard 1k EEPROM.
FIG. 2 shows the manufacturer block of a MIFARE memory.
FIG. 3 shows the sector trailer of a sector of MIFARE memory.
Figure 4:
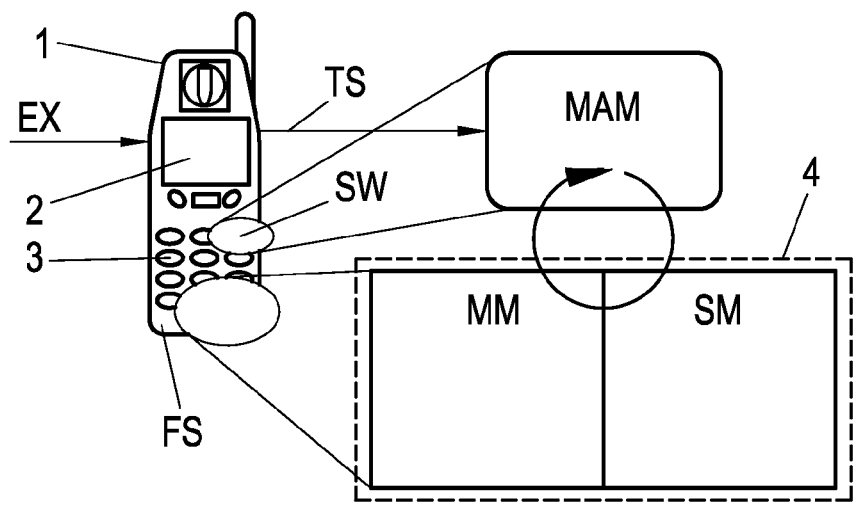
FIG. 4 shows a schematic block circuit of an embodiment of a mobile communication device according to the present invention.

A first embodiment of the invention will now be explained in detail by reference to FIG. 4. FIG. 4 shows a schematic representation of a mobile communication device 1 being configured as mobile phone with Near Field Communication (NFC) abilities. The mobile communication device 1 has a user interface comprising a keyboard 3 and a display 2. It further comprises a processor and memory (not shown in the drawing) for executing software SW. The software SW comprises an operating system for carrying out and managing all functions of the mobile communication device 1. The mobile communication device 1 further comprises a memory with a file system FS being controlled by the operating system of the device. The file system FS may be configured as solid state memory, but could also be configured as a magnetic or optic storage device offering read/write access to the software SW. The mobile communication device further comprises a MIFARE memory MM which can either be configured as a MIFARE Classic card or a MIFARE Emulation card. The MIFARE memory MM is arranged in the mobile communication device 1, wherein the MIFARE memory can either be fixedly installed in the mobile communication device 1 or can be a removable card device. The mobile communication device 1 further comprises a swap memory SM. This swap memory SM is either located in the file system FS of the mobile communication device 1, or in a non-volatile memory device arranged in the mobile communication device 1. For instance, the swap memory SM is located in a secure memory of a smartcard 4, e.g. a SmartMX card, being schematically represented in FIG. 4 by dotted lines. In the present example the smartcard 4 also comprises a memory portion that emulates the MIFARE memory MM. However, it should be emphasized that the MIFARE memory MM can also be a MIFARE Classic card, e.g. 1 kB or 4 kB card.

According to the invention the mobile communication device 1 comprises a MIFARE applications manager MAM. In the present embodiment of the invention the MIFARE applications manager MAM is a software module being contained in the software SW of the mobile communication device 1. The MIFARE applications manager MAM has the ability to store MIFARE applications in both the MIFARE memory MM and the swap memory SM, to read MIFARE applications from both the MIFARE memory MM and the swap memory SWAP MEMORY, and to delete MIFARE applications from both the MIFARE memory MM and the swap memory. Due to these abilities the MIFARE applications manager MAM is able to swap MIFARE applications from the MIFARE memory MM to the swap memory SM and vice versa. MIFARE applications are for instance tickets, coupons, access controls, e-purse functions, etc.

MIFARE applications are loaded into the mobile communication device 1 e.g. by a Service Provider sending a SMS to the mobile communication device 1 (when configured as a mobile phone), or by means of a NFC reader/writer when the mobile communication device 1 has NFC capabilities and is located within the range of such a NFC reader/writer. Other ways to install MIFARE applications in communication devices 1 comprise for instance HTTP, Https and other data transmission protocols. The MIFARE applications manager MAM first receives all MIFARE applications that are to be installed in the mobile communication device 1. Each time an operation like "install" or "remove" of a MIFARE application has to be carried out the MIFARE applications manager MAM tries to find the best combination of MIFARE applications to be written in the MIFARE memory MM. When doing so the MIFARE applications manager MAM may follow automated swapping rules, e.g. according to a begin or end date and/or time of a MIFARE application, or the available space in the MIFARE memory.

Due to the present swapping mechanism it is not any longer necessary to keep all MIFARE applications in the MIFARE memory MM, but some MIFARE applications can be stored in the swap memory SM. Thereby the limitation of the small size of MIFARE memory MM is overcome.

Generally, it is preferred that the swap memory SM is bigger than the MIFARE memory MM. This allows to keep backup-copies of all MIFARE applications that are installed in the MIFARE memory and to store additional MIFARE applications.

While the automatic swapping rules guarantee an appropriate swapping management of the stored MIFARE applications, there are still applications where influence on the swapping of MIFARE applications from either inside or outside of the mobile communication device 1 is needed. The present invention also provides a solution for this need by adapting the MIFARE applications manager MAM to detect a trigger signal TS and to carry out swapping of MIFARE applications when such a trigger signal TS is detected. An example of such a trigger signal TS is an internal alarm signal, e.g. generated by a timer or calendar application of the mobile communication device 1. However, generation of the trigger signal TS itself may depend on external events or signals EX. These external events or signals EX comprise e.g. one or more of the following:

A swapping instruction sent by a Service Provider etc. to the mobile communication device either as an SMS via the over-the-air service of a Mobile Network Operator or via RFID reader/writers which are connected to the Service Provider via a communication network. For the implementation of this feature the MIFARE applications manager MAM comprises an interface to the SMS stack in order to give the mobile communication device 1 being configured as a NFC phone the ability to trigger a MIFARE application swapping operation on reception of a "Swapping-SMS" which contains all the information about the swapping operation to be done. For example, the user of the mobile communication device 1 has got several concert tickets installed in his device. Due to size limitation not all of the concert tickets can be located in the MIFARE memory MM. Further, there is no specific data assigned to the tickets that would allow the MIFARE applications manager MAM to perform an automatic swap. However, with the SMS trigger method a backend server will be able to send a Swapping SMS to the mobile communication device 1 a short time before the concert date, in order to instruct the MIFARE applications manager MAM to perform a swap and put the right concert ticket into the MIFARE memory MM.

A voice instruction or a sound signal, e.g. an infra- or ultra-some signal. The user can trigger a swapping by giving voice order to his mobile communication device 1. Also, the mobile communication device 1 can receive some infrasonic or ultrasonic sound signals that instruct the MIFARE applications manager MAM to trigger the swapping of MIFARE applications. These sound signals are inaudible to the user of the mobile communication device 1.

A position signal, like a GPS signal. In order to process the GPS signal a GPS system is embedded in the mobile communication device 1. When the mobile communication device 1 is entering a certain area, swapping is triggered. For example, when the user enters a specific supermarket all coupon applications relating to this supermarket are swapped into the MIFARE memory MM.

An internal alarm signal, e.g. generated by a timer or calendar application of the mobile communication device 1. Thus, at a specific date the calendar can trigger a swapping event.

Figure 5:
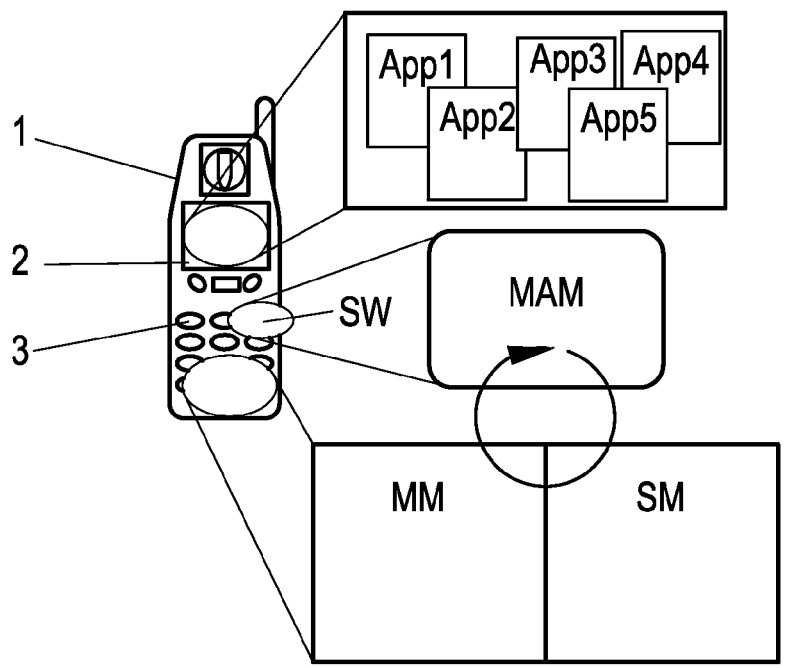
FIG. 5 shows a schematic block circuit of another embodiment of a mobile communication device according to the present invention.

The trigger signals TS that are detectable by the MIFARE applications manager MAM may also be signals generated by the user interface of the mobile communication device 1, particularly by the keyboard 3. Thereby the MIFARE applications manager MAM offers an interface to the user of the mobile communication device 1 to enable him/her to trigger a MIFARE applications swapping by himself/herself. The MIFARE applications manager MAM could also offer an interface for application developers. User-triggering is shown in FIG. 5 for five MIFARE applications App1 to App5. For example, the MIFARE applications App1 to App5 are applications like wallets, or generally application allowing the user to manage a set of MIFARE applications. For instance, the user could have installed ten coupons in his mobile communication device 1, but there is only one application (e.g. application app1) necessary to manage all the coupons swapping. It is assumed that not all of the coupons can be located in the MIFARE memory MM. It is further assumed that there is no specific data the MIFARE applications manager MAM could use to perform an automatic swap. Nevertheless, by enabling the user to manage MIFARE applications swapping the user will be able to choose which coupons he needs to be located in the MIFARE memory MM at the moment.

Now the present invention will be explained by way of four use case examples. In these use cases examples MIFARE Classic 1K devices are used, although this invention covers any MIFARE Classic and emulation memory size. Further, the use case examples are based on automatic MIFARE applications swapping by using the begin date of MIFARE applications. Nevertheless this invention covers automatic MIFARE applications swapping based on any kind of information (application priority, end date, etc.).

Figure 6:
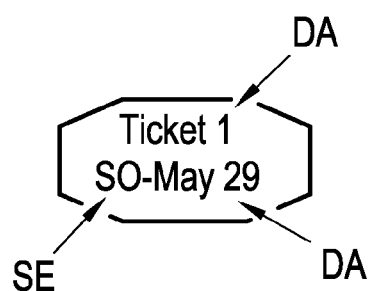
FIG. 6 shows a representation of a MIFARE Application and its properties.

In the use cases each MIFARE application is characterized by a symbol shown in FIG. 6 having the following properties:

Sector Information SE

For instance, sector nos. S0 to S15 indicate that this application is currently located in the MIFARE memory MM at the sectors 0x00 to 0x0F. Lacking sector information means that this MIFARE application is currently not located in the MIFARE memory MM.

Date Information DA

Represents the begin date of validity for the MIFARE application.

Application Name AN

The name of the MIFARE application. In the use cases, all MIFARE application are named by a "type of application" followed by a number. This "type of application" may be either written as full text, e.g. the term "Ticket" in FIG. 6, or—for the sake of better readability may be abbreviated like in FIGS. 7 to 10. The following abbreviations are used, but it has to be noted that the types of applications are not limited to these examples:

AC Access Control
CP Coupon
TK Ticket
TR Transit

Figure 7:
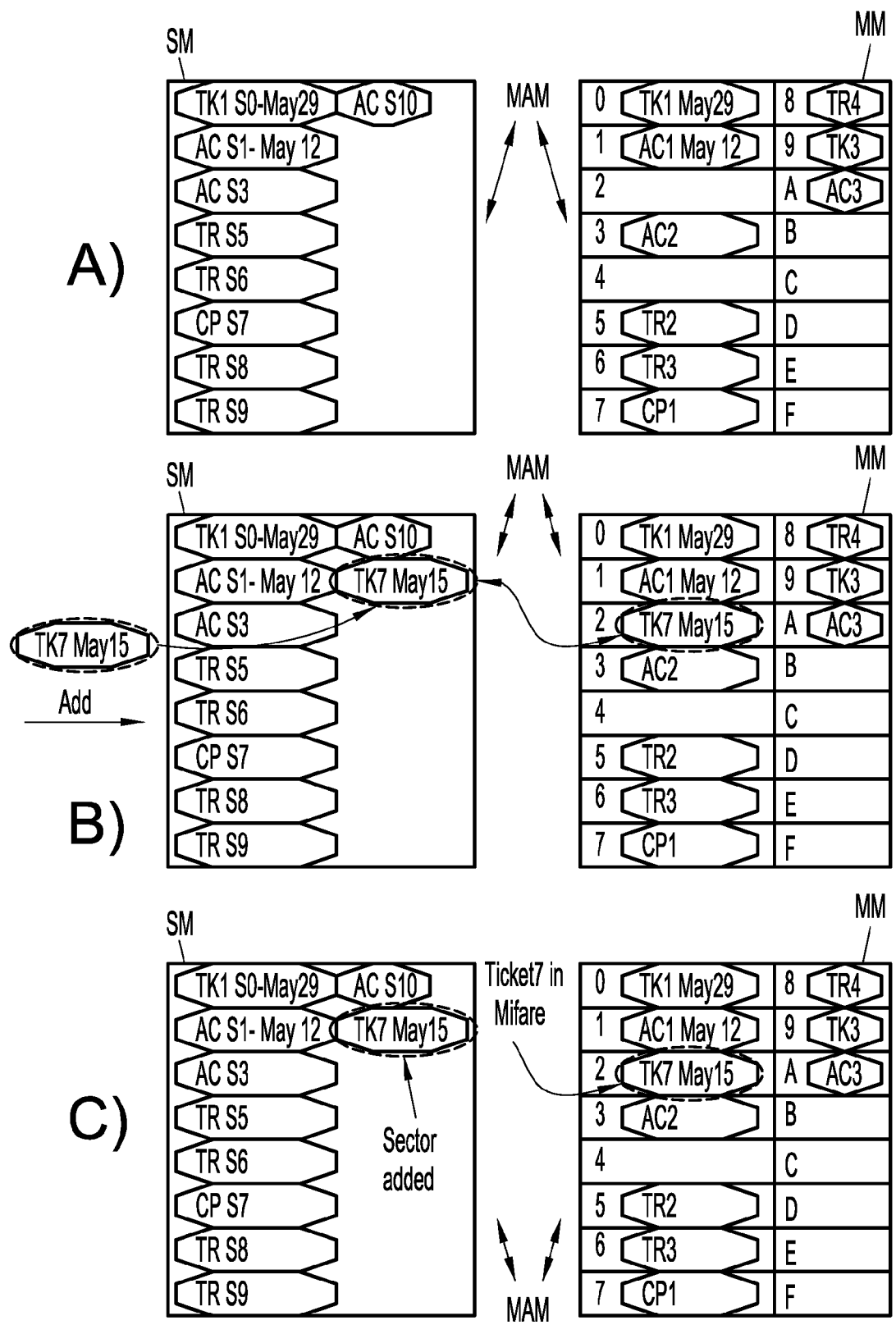
FIGS. 7 to 10 show flowcharts of the status of the MIFARE memory and the swap memory for four use case examples of the present invention.

The first use case shown in FIG. 7 explains how a new MIFARE application "Ticket 7" is added. In the initial state A of FIG. 7 each MIFARE application that is located in the MIFARE memory MM is also stored in the swap memory SM. The second state B of FIG. 7 shows that a new MIFARE ticket named "Ticket7" is added. The MIFARE applications manager MAM first stores this MIFARE application "Ticket7" in the swap memory SM and then searches for a free sector in the MIFARE memory MM. A free sector (sector 0x2) is found and swapping can be done between the free MIFARE memory sector 0x2 and the "Ticket7", meaning the MIFARE application "Ticket7" is written into sector 0x2 of the MIFARE memory MM by the MIFARE applications manager MAM. In the final state C of FIG. 7 it is shown that the MIFARE application "Ticket7" resides in both the MIFARE memory MM and the swap memory SM.

Figure 8A:
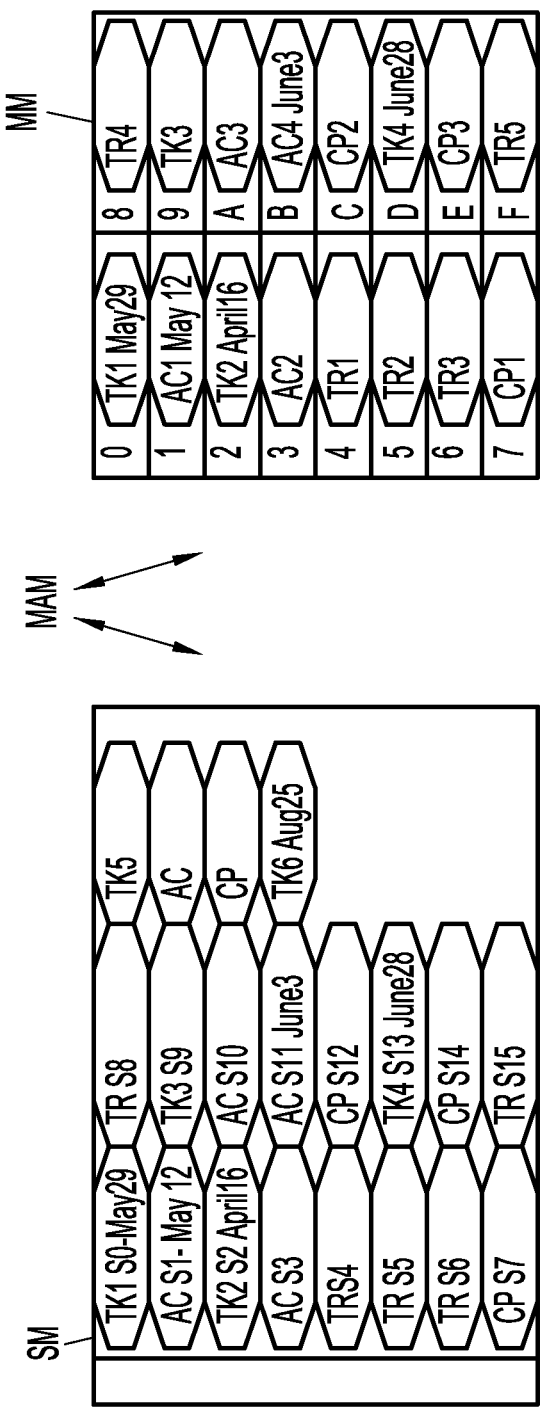
Figure 8B:
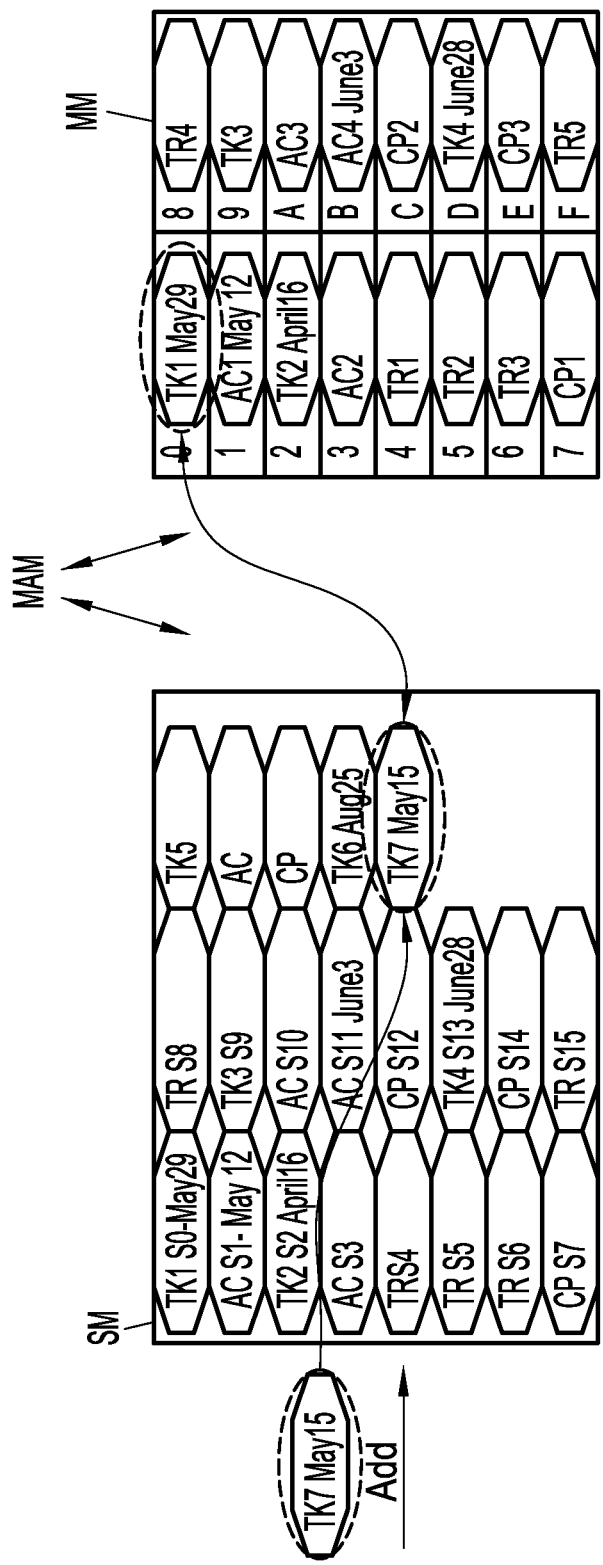
Figure 8C:
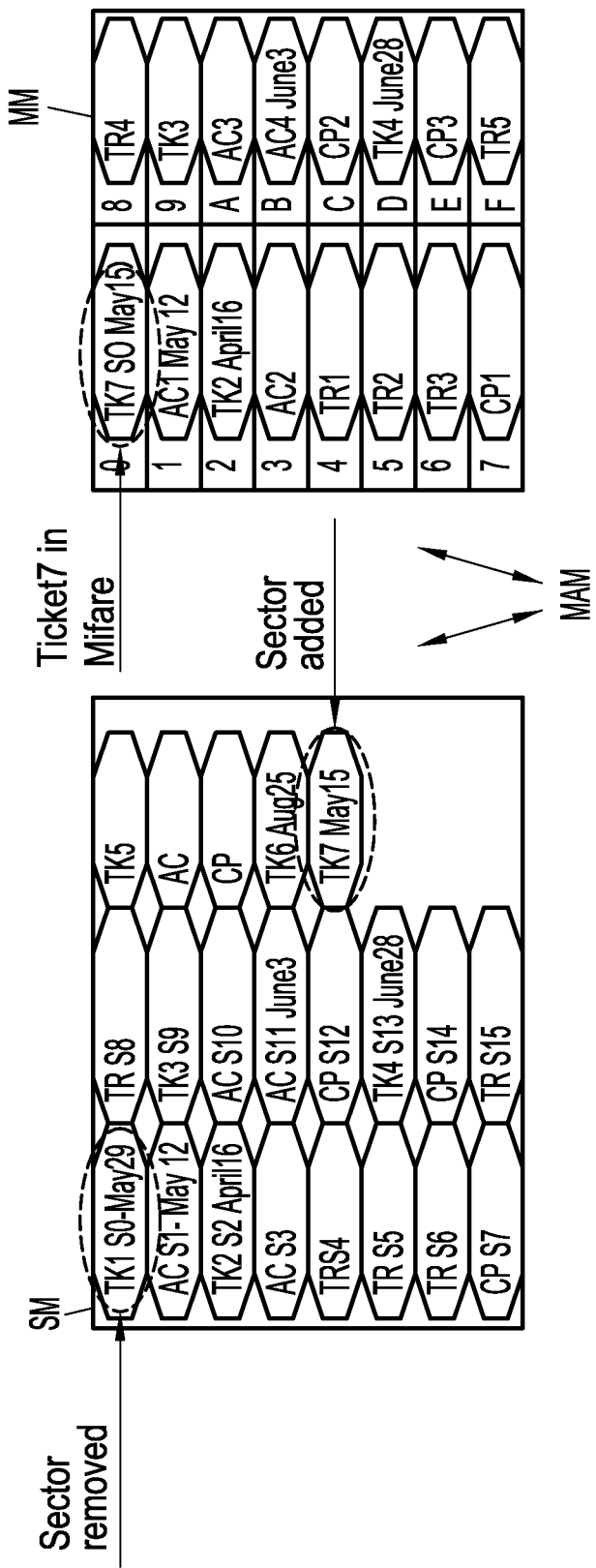

The second use case shown in FIG. 8A to 8C explains how the MIFARE applications manager MAM handles a situation when The MIFARE memory MM is full, but the new MIFARE application"Ticket7" must be installed. Initial state A of FIG. 8A reveals that each MIFARE application located in the MIFARE memory MM is also stored in the swap memory SWAP MEMORY SM. It is also shown that the MIFARE memory MM is full and that the swap memory SM contains more MIFARE applications than the MIFARE memory MM. These excess MIFARE applications in the swap memory SM are not associated with a sector of the MIFARE memory MM. In the next state (FIG. 8B) the new ticket "Ticket7" is added to the swap memory SM. However, the MIFARE applications manager MAM does not find a free sector in the MIFARE memory MM. Hence, the MIFARE applications manager MAM browses the MIFARE memory MM for existing MIFARE applications having a later begin date of validity than that of the new MIFARE application "Ticket". It finds the MIFARE application "Ticket1" complying with this condition. Now the MIFARE applications manager MAM carries out swapping between these two tickets "Ticket1" and "Ticket7". The final state (FIG. 8C) shows the result of the swapping operation. In the swap memory SM "Ticket1" is still stored, but has no longer a sector indication (meaning that it is no longer located in the MIFARE memory MM). On the other hand, a sector indication (sector 0x2) has been added to the "Ticket7" in the swap memory SM and this MIFARE application "Ticket7" is now also stored in sector 0x2 of the MIFARE memory MM.

Figure 9:
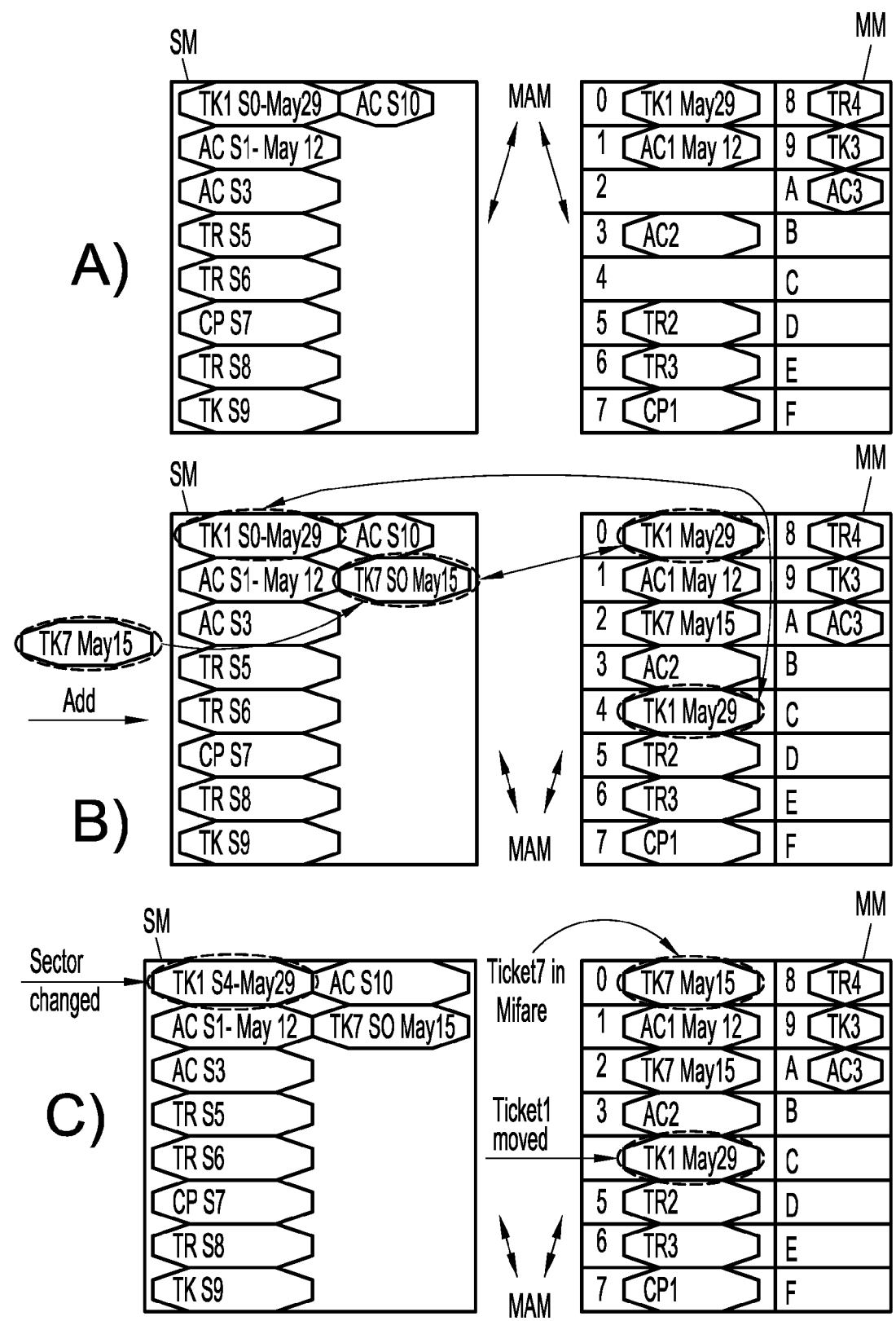

The third use case shown in FIG. 9 explains how the MIFARE applications manager MAM handles a situation in which two MIFARE applications want to be located at the same MIFARE Memory sector. As can be seen in the initial state A of FIG. 9 each MIFARE application located in the MIFARE memory MM is also stored in the swap memory SM. In state B of FIG. 9 the new ticket"Ticket7" is added. This MIFARE application has already got a sector number (sector 0x0) meaning that it is requested (by the Service Provider etc.) to store this MIFARE application in sector 0x0 of the MIFARE memory MM. However, as will be appreciated this sector 0x0 of the MIFARE memory MM is occupied by a MIFARE application "Ticket1" which has a later begin date than the new MIFARE application "Ticket7". Therefore, swapping can be done between these two tickets. MIFARE applications manager MAM will now try to swap "Ticket1". A free sector in the MIFARE memory MM is found (sector 0x4) so that swapping can be done. In the final state C of FIG.

9 it is shown that in the swap memory SM the sector information for "Ticket1" has been changed from sector 0x0 to sector 0x4. The new MIFARE application "Ticket1" is now stored in the MIFARE memory at sector 0x0 and "Ticket1" is stored at sector 0x4.

Figure 10A:
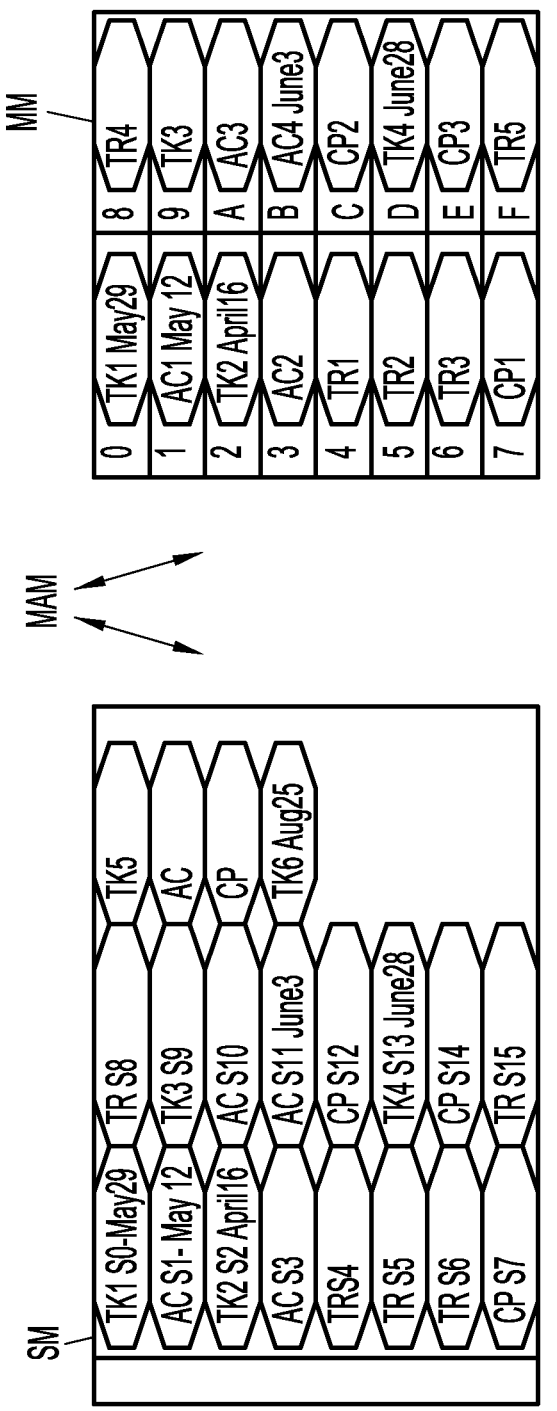
Figure 10B:
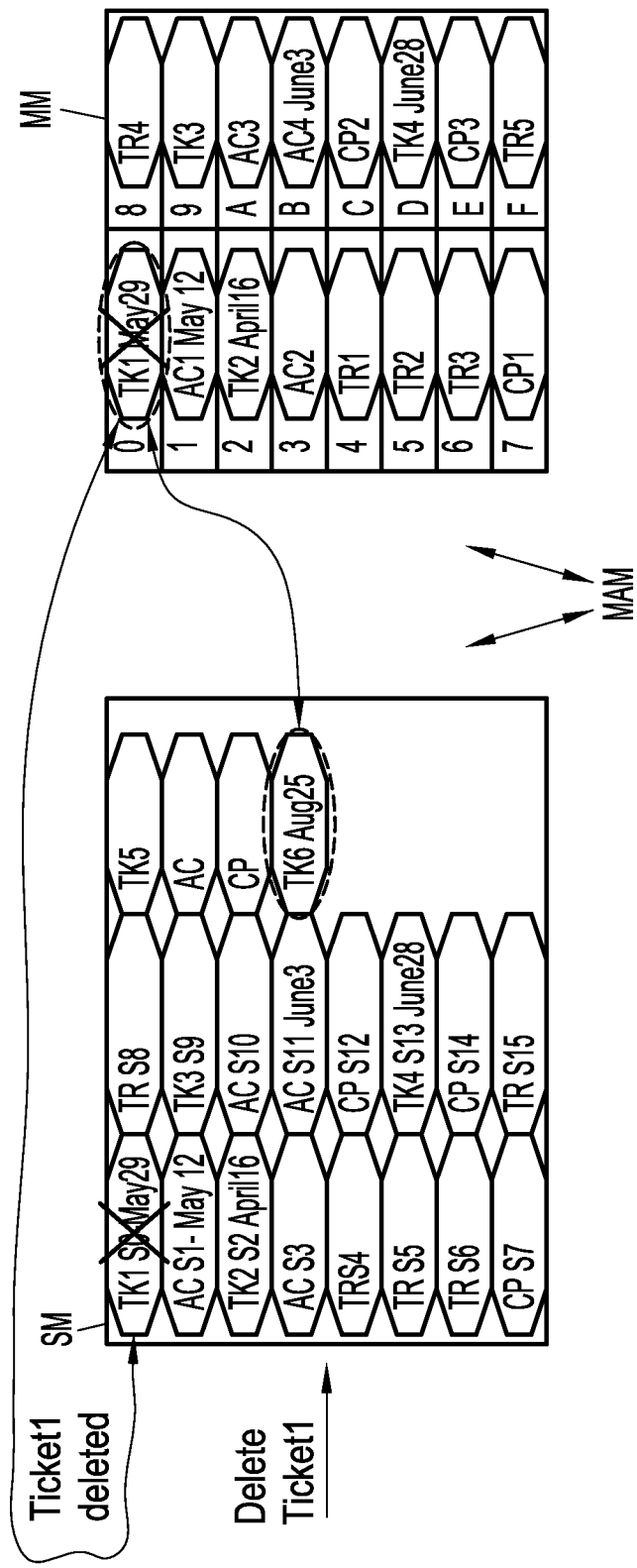
Figure 10C:
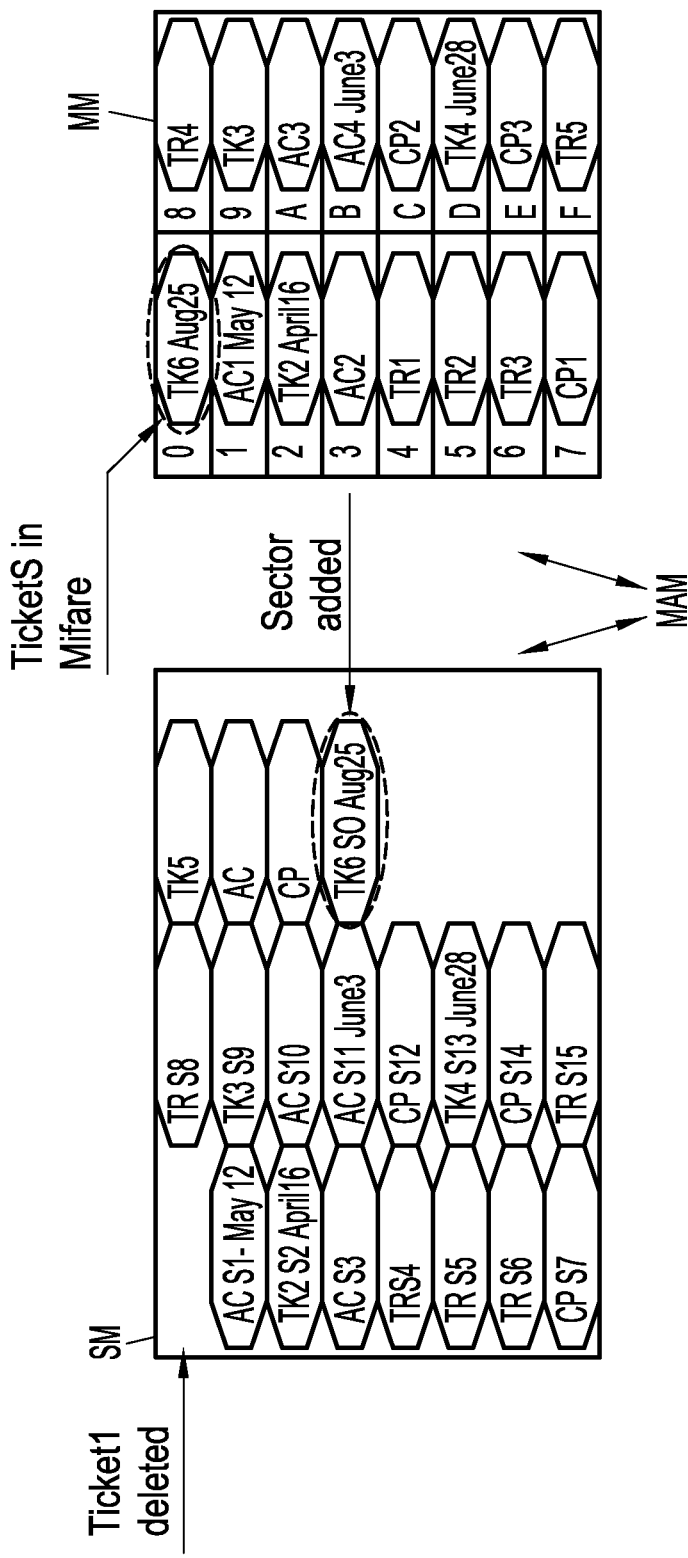

The fourth use case shown in FIGS. 10A to 10C explains how the MIFARE applications manager MAM removes a MIFARE application. In the initial state (FIG. 10A) each MIFARE application located in the MIFARE memory MM is also stored in the swap memory SM. The MIFARE memory MM is full and the swap memory SM contains a higher number of MIFARE applications than the MIFARE memory MM. These excess MIFARE applications in the swap memory SM are not associated with a sector number of the MIFARE memory MM. In the next state (FIG. 10B) the MIFARE application "Ticket1" is deleted from both the swap memory SM and the MIFARE memory MM. After deleting is completed the MIFARE applications manager MAM looks for excess MIFARE applications located in the swap memory SM that could be located in the MIFARE memory MM. MIFARE application "Ticket6" meets this condition, so swapping can be done. The final state (FIG. 10C) shows the result of this swapping operation. The MIFARE application "Ticket1" has been removed from both the swap memory SM and the MIFARE memory MM and the MIFARE application "Ticket6" has been stored in the MIFARE memory MM and a sector number (0x0) has been added to the MIFARE application "Ticket6" in the swap memory SM.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A mobile communication device comprising:
a first memory, wherein the first memory is organized according to an ISO14443 standard protocol;
a second memory that is different from the first memory, wherein the second memory comprises swap memory; and
an applications manager configured to swap applications between the first memory and the swap memory such that a first application that is stored at a first location on the first memory prior to swapping replaces a second application that is stored at a second location on the swap memory, and such that the second application replaces the first application at the first location on the first memory, wherein the first application is different from the second application.

2. The mobile communication device as claimed in claim 1, wherein the swap memory and the first memory are located in a file system of the mobile communication device.

3. The mobile communication device as claimed in claim 1, wherein the swap memory is located in a non-volatile memory device arranged in the mobile communication device.

4. The mobile communication device as claimed in claim 3, wherein the swap memory is located in a secure memory of a smartcard arranged in the mobile communication device, wherein the secure memory of the smartcard is separate from the non-volatile memory device.

5. The mobile communication device as claimed in claim 1, wherein the swap memory has a greater capacity than the first memory.

6. The mobile communication device as claimed in claim 1, wherein the applications manager is configured to detect a trigger signal and configured to swap the applications between the first memory and the swap memory in response to detecting the trigger signal.

7. The mobile communication device as claimed in claim 6, wherein the trigger signal detectable by the applications manager comprises a swapping instruction received from a Radio-frequency identification (RFID) device.

8. The mobile communication device as claimed in claim 6, wherein the trigger signal detectable by the applications manager comprises one of an infra-sonic sound signal and an ultra-sonic sound signal.

9. The mobile communication device as claimed in claim 6, wherein the trigger signal detectable by the applications manager comprises a Global Positioning System (GPS) signal.

10. The mobile communication device as claimed in claim 6, wherein the trigger signal detectable by the applications manager comprises an internal alarm signal generated by one of a calendar application running on the mobile communication device.

11. The mobile communication device as claimed in claim 6, wherein the trigger signals detectable by the applications manager comprise signals generated by a user interface of the mobile communication device.

12. The mobile communication device as claimed in claim 1, wherein the applications manager is configured to process swapping of MIFARE applications based on a begin and end time of an application stored on the mobile communication device.

13. The mobile communication device as claimed in claim 1, wherein the mobile communication device comprises a NFC Near Field Communication (NFC) mobile phone.

14. The mobile communications device defined in claim 1, wherein the first memory is partitioned into first memory sectors and the swap memory is partitioned into second memory sectors, wherein the applications manager is further configured to:
store the first application at a selected one of the first memory sectors on the first memory; and
search the swap memory to determine whether any of the second memory sectors is free of data after the first application has been stored at the selected one of the first memory sectors.

15. The mobile communications device defined in claim 14, wherein, in response to identifying that a given one of the second memory sectors is free of data, the applications manager is further configured to:
store the first application at the given one of the second memory sectors on the swap memory.

16. The mobile communications device defined in claim 14, wherein, in response to identifying that none of the second memory sectors are free of data, the applications manager is further configured to:
swap the first application stored at the first memory sector on the first memory with a selected application stored at a corresponding one of the second memory sectors on the swap memory.

17. The mobile communications device defined in claim 14, wherein, in response to identifying that none of the second memory sectors are free of data, the applications manager is further configured to:
- identify a first validity period associated with the first application;
- search the swap memory to identify a second application on the swap memory having a second validity period that is after the first validity period and a corresponding second memory sector on which the identified second application is stored; and
- swap the first application with the identified second application so that the first application is stored at the corresponding second memory sector and the identified second application is stored at the first memory sector.

18. A method for managing applications in a mobile communication device that comprises a first memory organized according to an ISO14443 standard protocol, a swap memory that is different from the first memory, and an applications manager, the method comprising:
- with the applications manager, swapping a first application stored at a first location on the first memory with a second application that is different from the first application and that is stored at a second location on the swap memory, such that the first application is stored at the second location on the swap memory and the second application is stored at the first location on the first memory after swapping the first and second applications.

19. The method as claimed in claim 18, wherein the swap memory is located in at least one of a file system of the mobile communication device, a nonvolatile memory device arranged in the mobile communication device, and a secure memory of a smartcard arranged in the mobile communication device.

20. The method as claimed in claim 18, further comprising:
- with the applications manager, detecting a trigger signal and swapping the applications between the first memory and the swap memory in response to detecting the trigger signal.

21. The method as claimed in claim 20, wherein the detected trigger signals comprise signals generated by a user interface of the mobile communication device.

22. The method as claimed in claim 18, further comprising swapping the applications according to at least one automated swapping rule.

23. A non-transitory machine-readable medium embodying a computer program product comprising software code portions that, when executed by a mobile communication device, causes the mobile communication device to perform the method of claim 18.

24. The non-transitory machine-readable medium of claim 23, wherein the computer program product is downloadable from a remote server via a communication network.

25. A mobile communication device with an arithmetic-logic unit and a memory, wherein the mobile communication device is adapted to process the computer program product as claimed in claim 23.

26. The mobile communication device as claimed in claim 25, being configured as a mobile phone having Near Field Communication (NFC) capabilities.

* * * * *